Jan 15, 1929.
R. H. WENTORF ET AL
1,698,927
BASE FOR COOKING UTENSILS
Filed Dec. 6, 1926
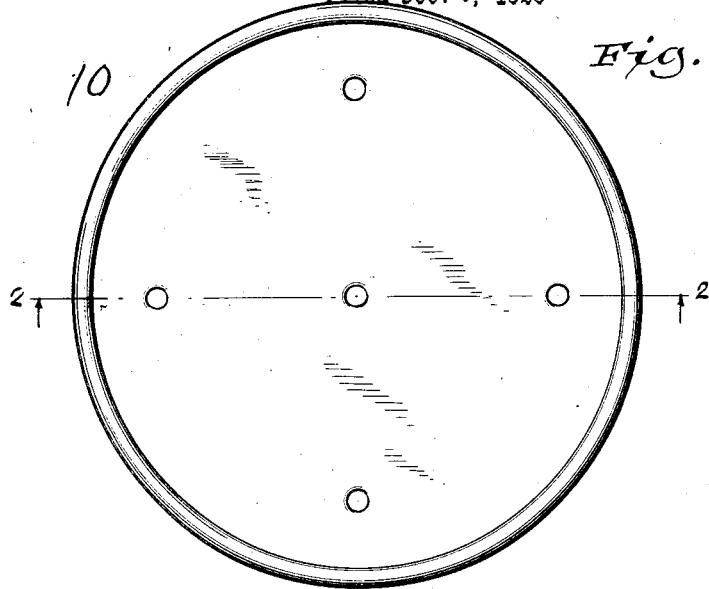
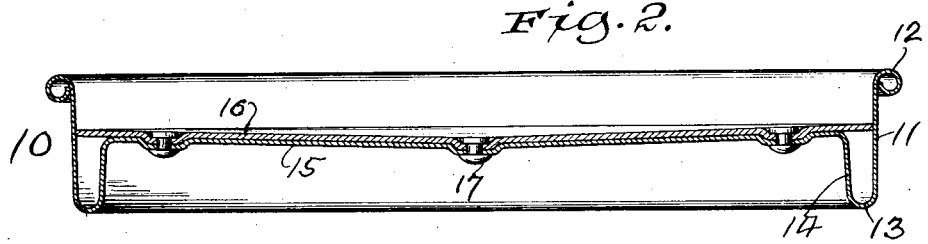
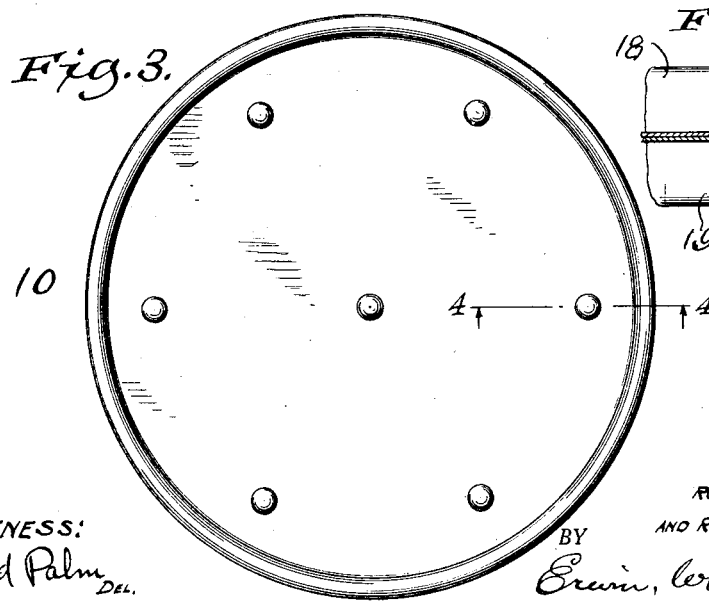
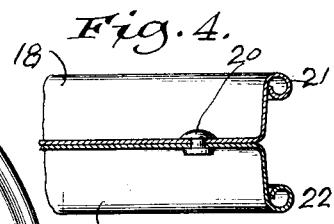
INVENTORS:
ROBERT H. WENTORF
AND RALPH N. KIRCHER
BY
ATTORNEYS
WITNESS:

Patented Jan. 15, 1929.

1,698,927

UNITED STATES PATENT OFFICE.

ROBERT H. WENTORF AND RALPH N. KIRCHER, OF WEST BEND, WISCONSIN, ASSIGNORS TO WEST BEND ALUMINUM COMPANY, OF WEST BEND, WISCONSIN, A CORPORATION OF WISCONSIN.

BASE FOR COOKING UTENSILS.

Application filed December 6, 1926. Serial No. 152,857.

Our invention relates to cooking or heating vessels and utensils, and is specifically applicable to use in connection with cooking or heating utensils of the waterless type, but is capable of use with such utensils of other types.

The purpose of the invention is the production of a base which is designed to be interposed between the flame and the vessel containing the substances to be cooked or heated, and to maintain such a desired temperature within the vessel as will effect proper cooking without scorching the substances therein, or causing them to stick during the cooking or heating process.

The invention resides in a peculiar construction of base whereby its purposes as above stated are achieved, and it consists in a specially formed sheet metal base in which there is interposed between the flame and the vessel containing the materials to be cooked, a laminated metal structure which experiment has shown produces a better diffusion of the heat, with the result that the character of the latter is softened, and the liability to the burning or sticking of the materials being cooked in the vessel is eliminated. The base is of circular form and is provided upon its upper face with a depressed seat for the cooking vessel, while at its under side a recess is formed in which the heat from the flame is conserved. The lamination is located horizontally at about the middle line of the base, to effect the formation of the seat and the heat conserving recess.

The details of construction residing in our invention will be specifically described, and the novelty thereof pointed out in the appended claims.

In the accompanying drawing:

Figure 1 is a plan view of our improved base.

Fig. 2 is a vertical central section of the base, the view being taken on the line 2—2, Fig. 1.

Fig. 3 is a bottom view of the base shown in Figs. 1 and 2.

Fig. 4 is a vertical section on a radial line through the outer edge of the base, and showing a modified structure, the view supposedly being taken on the line 4—4, Fig. 3.

In the drawing, the numeral 10 indicates the base as a whole. Such base is formed from a disc of sheet metal by the dies of a drawing press. It comprises an endless wall 11 with the outer margin of the disc metal returned so as to form the bead 12, to reenforce and finish one edge of the wall 11. Leading inwardly from the other edge of the wall 11, is an annular bridge 13 by means of which the inner concentric wall 14 is connected to the wall 11. Integrally formed out of the disc of sheet metal, and supported by the inner wall 14, is a division plate 15, which extends substantially in a horizontal plane located about the middle of the circular wall 11.

The opening at the upper side of the base is designed to form a seat for the cooking vessel, while that at the lower side is designed to form a heat retaining and conserving chamber. We have found that the transmission of heat through a single plate is very rapid, and necessitates careful regulation of the heat to avoid scorching and sticking of the materials being cooked in the vessel. We have found also that the severe nature of the heat can be greatly modified, by requiring it to pass through a lamination of metal plates, and with the idea of producing an efficient structure, we superpose upon the first plate 15 a second plate 16, which latter is in the form of a disc, the peripheral edge of which is caused to be brought into close engagement with the inside of the wall 11, when the plate 16 is brought into engagement with the plate 15. The plates 15 and 16 are connected by rivets 17, which serve to unite them firmly as a unitary structure. An advantage in causing a tight fit between the plate 16 and the wall 11, is that crevices for the entry of foreign matters are avoided, and the base has an entirely smooth surface which may readily be cleaned.

Fig. 4 shows a modification of the construction in which the laminated feature is preserved. In this construction we form by stamping two cups 18 and 19, the bottoms of which are brought together, with the cups reversed, and riveted as at 20, to constitute the laminated structure. The outer margin of the disc of sheet metal from which the cups 18 and 19 are formed, is returned upon the outside of the wall of the cup to form the beads 21 and 22 respectively.

When the heat is applied to that horizontal plate to which it is exposed, the heat is not always evenly distributed. But in the transmission of the heat to the second plate, a very even diffusion occurs. The result of this is that there is a more even distribution of the heat when it reaches the cooking vessel positioned upon the base.

Having thus described our invention, what we claim and desire to secure by Letters Patent of the United States, is:

1. A sheet metal base for cooking utensils having substantially vertical side walls, with a division plate integral with the walls supported in horizontal position between the top and bottom of the walls, and a second sheet metal plate forming a lamination contacting with and secured thereto, to constitute a seat for a vessel at the upper side and a heat conserving chamber at the lower side.

2. A sheet metal base for cooking utensils having a circular outer wall and a concentric inner wall slightly separated therefrom, with a division plate integral with the inner wall extending transversely of the base in a plane substantially at the middle height of the wall, and a circular plate engaging the inside of the outer wall and attached to the first plate to form a lamination, the space above the lamination constituting a seat for a cooking vessel, and the space below a heat conserving chamber.

In testimony whereof, we have signed our names at West Bend, this 4th day of December, 1926.

ROBERT H. WENTORF.
RALPH N. KIRCHER.